Oct. 11, 1960

C. FULOP 2,955,443

TORQUE LIMITING PULLEY

Filed Sept. 15, 1959

INVENTOR.
CHARLES FULOP
BY
*Sanford Schumacher*
ATTORNEY.

Oct. 11, 1960
C. FULOP
2,955,443
TORQUE LIMITING PULLEY
Filed Sept. 15, 1959
2 Sheets-Sheet 2
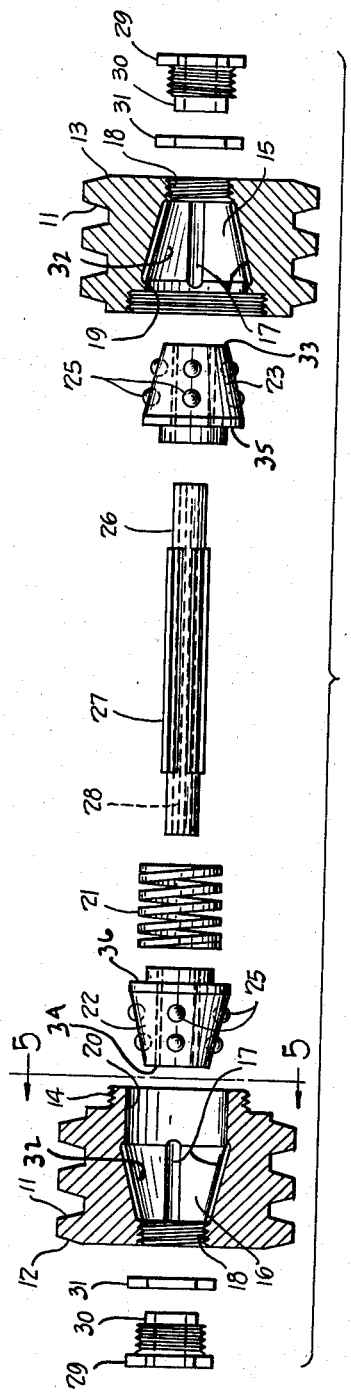
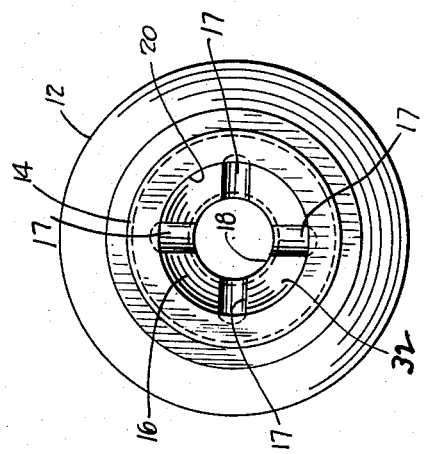
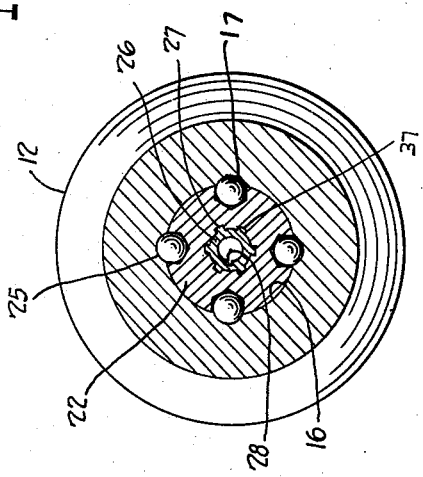
INVENTOR.
CHARLES FULOP
BY
*Sanford Schuurmacher*
ATTORNEY.

United States Patent Office 2,955,443
Patented Oct. 11, 1960

2,955,443

TORQUE LIMITING PULLEY

Charles Fulop, 131 Skyview Drive,
Seven Hill Village, Ohio

Filed Sept. 15, 1959, Ser. No. 840,168

4 Claims. (Cl. 64—28)

This invention relates to pulleys, and particularly to a torque limiting pulley.

The primary object of this invention is to provide a belt driven pulley for machines that will automatically limit the applied power to a predetermined maximum torque.

Another object is to provide a pulley of the type stated that will prevent excessive torque from being applied to the drive shaft of a machine, thereby preventing damage or breakdown of the machine.

A further object is to provide a belt pulley of the type stated that can be easily adjusted to cut off the driving power at a desired predetermined torque.

Still another object is to provide a torque limiting pulley that will automatically reconnect the power drive when the excessive torque has been relieved or reduced to a predetermined level.

Another object is to provide a pulley of the type stated that is rugged in structure, reliable in operation, and easily adjustable over a wide range.

These and other objects of the invention will become apparent from a reading of the following specification and claims, together with the accompanying drawings, wherein like parts are referred to and indicated by like reference numerals, and wherein:

Figure 3 is an exploded view of the pulley;

Figure 4 is a cross-sectional view, taken along the line and in the direction of the arrows 4—4 of Figure 2; and Figure 5 is view taken along the line and in the direction of the arrows 5—5 of Figure 3.

Figure 1:
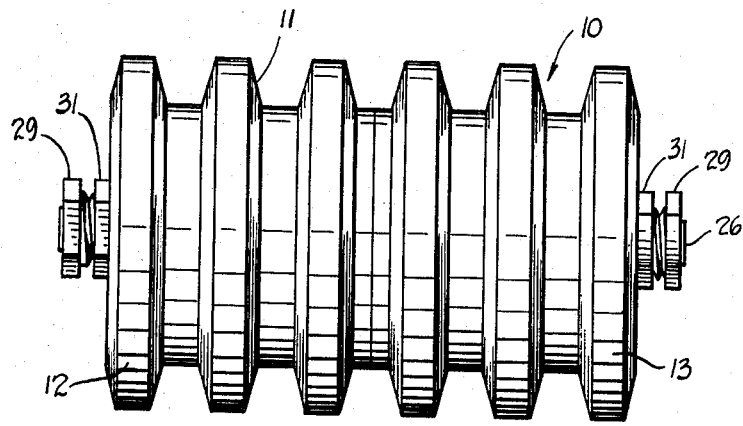
Figure 1 is a front elevation of the torque limiting pulley that is the subject of this invention.

Referring more particularly to the drawings, there is seen in Figure 1 the torque limiting pulley that is the subject of this invention, broadly indicated by reference numeral 10.

The pulley 10 comprises a hollow sheave made in two halves 12 and 13, joined through a threaded section 14 to form a unitary body member having a slotted rim 11 grooved to receive a plurality of V belts, not shown.

While the sheave has been illustrated as being screwed together, the two halves may be joined by means of long bolts, or any other suitable means. Furthermore, the rim of the sheave may be smooth to receive a conventional flat belt instead of being grooved as at 11 to receive V belts.

Figure 2:
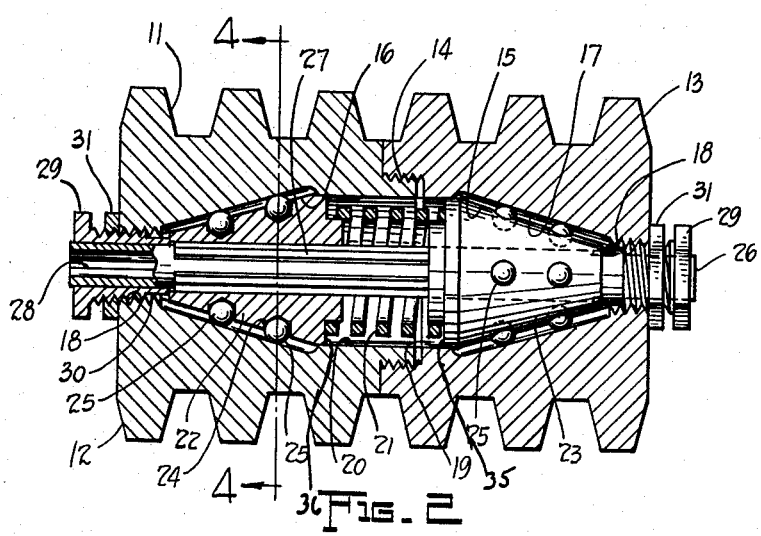
Figure 2 is a longitudinal sectional view of the same.

The interior of each sheave section 12 and 13 is bored out to define conical cavities 16 and 15 and straight bores 20 and 19, as seen in Figure 3, which together define two opposed frusto-conical cavities spaced apart by the abutting halves of the straight bores 20—19, when the two sections 12 and 13 are joined together, as seen in Figure 2.

The preferred taper of the conical cavity walls 32 is a 30° inclusive angle, which will provide an average maximum disengaging torque for the pulley, as explained hereinafter. The maximum torque can be increased by reducing the angle or reduced by increasing the angle.

Two, or more, half-round longitudinally extending slots 17 are cut in the walls 32 of each conical cavity 15 and 16. In the form of the device illustrated there are four such slots, as can be most clearly seen in Figures 3 and 5. Reference numeral 18 indicates a threaded axial bore through each end of the sheave sections 12 and 13, located at the apices of the frusto-conical cavities 16 and 15.

An externally threaded torque adjusting hollow collar 29 having an unthreaded anvil section 30, is nested in each bore 18 and is held at adjusted penetrations within the cavities 15 and 16 by lock nuts 31.

Reference numeral 26 indicates a hollow drive shaft that is journaled axially of the pulley sheave 12—13 through the hollow collars 29, so that the sheave is free to rotate thereon.

Reference numeral 27 indicates a plurality of spline ribs located at the central portion of the shaft 26, within the sheave cavities, as seen in Figure 2. The hollow shaft 26 has a key-way 28 cut in its inner surface, as seen in Figure 4.

The drive shaft 26 is adapted to receive the shaft of the machine to be driven, not shown, and to be keyed thereto by a suitable key seated in the key-way 28.

Two frustoconical clutch heads 22 and 23 are mounted on the shaft 26 within the sheave cavities 16 and 15, respectively, as seen in Figure 2. The conical heads 22 and 23 have spline slots 37 which mate with the spline ribs 27 of the drive shaft 26. The so mounted heads are thus free to slide longitudinally of the shaft 26 while at the same time being secured for rotation therewith by the spline ribs 27.

While the drive shaft 26 is illustrated as having six spline ribs, it is to be understood that any cross-sectional shape other than a circle, such as a square, triangle, or the like, may be used to effect the sliding fit required between the shaft and the clutch heads 22 and 23.

The frusto-conical clutch heads 22 and 23 are mounted on the drive shaft 26 with their respective bases 36 and 35 in opposition.

A helical expansion spring 21 is mounted co-axially of the shaft 26 within the straight bore 19—20 between the cone heads 22 and 23 with its ends bearing against their respective bases 36 and 35, to normally bias them apart.

Reference numeral 25 indicates pairs of aligned ball bearings which are set in the face of each clutch cone 22 and 23 and aligned to engage the cavity slots 17 when the heads 22 and 23 and their respective sheave cavities 16 and 15 are interfitted, as seen in Figures 2 and 4.

In their normal, or first position, the cone heads 22 and 23 have their apices 34 and 33, respectively, biased against the anvil ends 30 of the adjusting collars 29, as seen in Figure 2. At the same time each set of paired ball bearings is seated in the slots 17, there being a set for each slot.

In use, the pulley assembly 10 is mounted on the shaft of the machine to be driven in the same manner as a conventional pulley.

The hollow drive shaft 26 of the pulley is slipped over and keyed to the shaft of the machine, not illustrated.

Suitable V belts leading from an electric motor or other source of power are seated around the rim of the pulley 10 in the grooves 11, thereof.

It will be evident that when the sheave 12—13 is rotated by the driving belts the driver shaft 26 will also rotate to drive the machine to which it is keyed.

The only driving connection between the shaft 26 and the sheave 12—13 are the two clutch cones 22 and 23 with their embedded balls 25, which in turn engage the slots 17 in the sheave conical cavities 15 and 16.

Since the balls 25 are embedded to only half their diameters in their respective conical clutch heads 22 and 23 they will closely interfit the half-round slots 17 of the conical cavities 15 and 16 in the sheave halves 13 and 12 when the two clutch cones are in their normal, or first positions, fully fitted against their respective cavity walls 32, as illustrated most clearly in Figures 2 and 4.

In this normal, or first position, the apices 33 and 34 of the clutch cones 23 and 22 are seated against the anvil ends 30 of their respective torque adjusting collars 29, which are in their condition of least penetration into their respective cavities 15 and 16.

The two clutch cones 22 and 23 are normally biased into and maintained in this position by the expansion spring 21.

The drive shaft 26 will now turn as a unit with the sheave 12—13.

However, if the drive shaft 26 should be brought to a full stop or otherwise prevented from rotating at its usual rate by the jamming or stoppage of the driven machine, the belt driven pulley sheave 12—13 will try to continue to rotate and in doing so will apply an excessive torque to the clutch cone balls 25 which will act to cause them to try and roll longitudinally of the slots 17 toward the large ends of the conical cavities 15 and 16, in response to natural physical laws.

Thereupon the clutch cones 22 and 23 in which the balls 25 are embedded will be carried longitudinally of the slots 17 in the conical cavities 16 and 15 toward the large end thereof.

The clutch cones are able to be so carried because they are free to slide longitudinally of the drive shaft splines 27 against the pressure of the spring 21.

As the clutch cones 22 and 23 move thusly, relative to their respective conical cavities 16 and 15 the radial space between the cones 22 and 23 and their respective cavity walls 32 will increase until a second position is reached in which the balls 25 will be clear of the slots 17. This will disengage the sheave 12—13 from the drive shaft 26 thus instantly relieving the torque applied to the attached machine shaft.

The torque at which such disengagement will be effected is determined by the compression spring 21, because in order to effect disengagement the two clutch cones 22 and 23 must move against the ends of the spring 21 which bears against both their bases 36 and 35.

As soon as the balls 25 are clear of the slots 17 they are free to roll on the revolving cavity walls 32 between the slots 17. At the same time the compressive thrust against spring 21 is released and the spring instantly expands moving the apices 33 and 34 of the clutch cones 23 and 22 back toward the anvils 30 of their respective collars 29.

Furthermore, as the rotating sheave 12—13 continues to turn the balls 25 again drop into locked engagement with the sheave cavity slots 17.

If the driven machine is still jammed so that the resistance it offers to the rotation of the drive shaft 26 is still greater than the predetermined clutch release torque, the releasing cycle will be again repeated until the machine again becomes operable or the power applied through the driving belts is turned off.

The amount of torque that will trigger the releasing action can be varied between wide limits and can be set at any desired torque below the maximum one for a given pulley assembly.

The inherent maximum release torque for each particular pulley can be determined at the time of manufacture by varying the angle of taper of the conical cavities 15 and 16 and the clutch cones 23 and 22. The maximum disengaging torque is inversely proportional to the angle of taper.

Any particular pulley can be adjusted to release at a predetermined torque, below the built in maximum, by rotating the collars 29 which varies the depth of penetration of the anvil ends 30 into the cone cavities 15 and 16.

It will be evident, that at greater depths of penetration the anvils 30 will hold the clutch cone heads 22 and 23 in positions removed from intimate contact with the walls 32 of their respective cavities 16 and 15.

Thus it will require less turning torque to disengage the balls 25 from their slots 17, when the clutch heads are held spaced from their mating cavity walls, since the balls will not be nested as deeply in the slots to begin with. Similarly the cone heads 22 and 23 will have to move through a shorter distance to disengage the balls, so that the release will be effected quicker. In fact the clutch cones may be backed up so far by the anvils 30 that the balls cannot seat in the slots 17 at all, thus effecting release at zero torque.

The driving torque applied through such a pulley can be controlled so as to not exceed a predetermined maximum safe level. This feature is especially valuable in the case of machines that are liable to periodic jamming or stoppage of their moving parts, inherent to their normal operation, such as punch presses, cold forming machines, saws, and the like.

The use of opposed clutch cones 22 and 23 insures a balanced pulley with a minimum of vibration, since both cones move simultaneously toward or away from a common center of rotation. The use of a single cone would be possible, but not advisable, except at very low speeds, since the imbalance of the parts could cause serious vibration at high speeds.

It will now be clear that there has been provided a device which accomplishes the objectives heretofore set forth.

While the invention has been disclosed in its preferred form, it is to be understood that the specific embodiment thereof as described and illustrated herein is not to be considered in a limited sense, as there may be other forms or modifications of the invention which should also be construed to come within the scope of the appended claims.

I claim:

1. In combination with a shaft to be driven, a torque limiting pulley, comprising, a hollow sheave member having a power transmission belt engaging rim and a tapered cavity therein, a hollow drive shaft journaled axially of the tapered cavity through the ends of the sheave member, and adapted to fit over and be keyed to the shaft to be driven, a clutch cone mounted on the drive shaft within the tapered cavity, slidable longitudinally thereof, and spring biased against the wall of the tapered cavity in torque transmitting relation, means for disengaging the clutch cone from the sheave member at a predetermined torque, and, means for returning the clutch cone to torque transmitting engagement with the sheave member when the sheave member torque falls below a predetermined level.

2. In combination with a shaft to be driven, a torque limiting pulley, comprising, a sheave member having a power transmission belt engaging rim and a conical cavity therein centered on its long axis, the wall of said cavity having a plurality of spaced longitudinally extending slots therein, a hollow drive shaft journaled axially of the conical cavity through the sheave member ends and adapted to fit over and be keyed to the shaft to be driven, a conical clutch head of a shape complementary to that of the sheave cavity, mounted on the drive shaft and slidable longitudinally thereof in normally spring biased engagement with the conical cavity wall, said head having paired sets of ball bearings journaled therein, said sets being spaced circumferentially of the head to interfit the aforesaid conical cavity slots when the head is in a first position and to roll on the cavity wall between the slots when the head is in a second position, means for positioning the clutch head at a preletermined minimum distance from the wall of the conical cavity, whereby the depth of penetration of the clutch head balls in the cavity slots may be varied between predetermined limits when the head is in its first position, the disengaging torque between the balls and the slots being proportional to their depth of penetration, and, spring biased means for returning the clutch head and contained balls to torque transmitting engagement with the sheave cavity slots when the head is in its second position.

3. In combination with a shaft to be driven, a torque limiting pulley, comprising, a sheave member having a power transmission belt engaging rim and a conical cavity therein centered on its long axis, the wall of said cavity having a plurality of spaced, longitudinally extending slots therein, the sheave also having a bore through the end thereof at the apex of the conical cavity, a collar threadedly mounted in said bore and adjustable axially thereof between positions of varied penetration into said sheave cavity, a hollow drive shaft journaled axially of the conical cavity through the collar and adapted to fit over and be keyed to the shaft to be driven, the drive shaft having a longitudinally extending spline rib at its central portion, within the cavity, a frusto-conical clutch head mounted on the drive shaft and slidable longitudinally of the spline in normally spring biased engagement with the conical cavity wall, said head having paired sets of ball bearings journaled therein, said sets being spaced circumferentially of the head to interfit the aforesaid conical cavity slots when the head is in a first position and to roll on the cavity wall between the slots when the head is in a second position, the head being spring biased against the sheave collar when in its first position and being backed away from the collar when in its second position, the clutch head being held in adjusted positions relative to the wall of the conical cavity by the collar, whereby the depth of penetration of the clutch head balls in the cavity slots may be varied between predetermined limits when the head is in its first position, the disengaging torque between the balls and the cavity slots being proportional to their depth of penetration therein, and spring means for automatically returning the clutch head and its contained balls to torque transmitting engagement with the sheave cavity slots when the head is in its second position.

4. In combination with a shaft to be driven, a torque limiting pulley, comprising, a hollow sheave member having a power transmission belt engaging rim and two spaced and opposed frusto-conical cavities therein, centered on its long axis, the walls of each of said cavities having a plurality of spaced, longitudinally extending slots therein, the sheave also having a bore through each end thereof at the apex of each frusto-conical cavity; a collar threadedly mounted in each of said bores and adjustable axially thereof between positions of varied penetration into their respective cavities; a hollow drive shaft journaled axially of the two frusto-conical cavities, through the collars, and adapted to fit over and be keyed to the shaft to be driven, the drive shaft having a plurality of longitudinally extending spline ribs at its central portion within the cavities; a pair of opposed frusto-conical clutch heads mounted within their respective opposed cavities on the drive shaft splines and slidable longitudinally thereof; an expansion spring mounted between the opposed clutch heads, normally acting to bias the two heads into engagement with their respective cavity walls; each head having paired sets of ball bearings journaled therein, said sets being spaced circumferentially of their respective heads to interfit the aforesaid cavity slots when the heads are in a first position and to roll on their respective cavity walls between the slots thereof, when the heads are in a second position; the heads being biased by the expansion spring against their respective sheave collars when in their first positions and being fully backed away from said collars, when in their second positions; the clutch heads being held in adjusted positions relative to the walls of their respective frusto-conical cavities by their respective collars, whereby the depth of penetration of the clutch head balls in the cavity slots may be varied between predetermined limits, when each head is in its first position, the disengaging torque between the balls and their respective cavity slots being directly proportional to their depth of penetration; the expansion spring automatically acting, under compression, to urge the two clutch heads and their contained balls back into torque transmitting engagement with their respective sheave cavity slots when the heads are in their second positions.

References Cited in the file of this patent
UNITED STATES PATENTS

| | | |
|---|---|---|
| 2,164,870 | Salardi | July 4, 1934 |
| 2,238,583 | Dodge | Apr. 15, 1941 |
| 2,600,674 | Natkins | June 17, 1952 |